(No Model.) 4 Sheets—Sheet 1.
F. H. BANCROFT & H. M. RICH.
MACHINE FOR INSERTING DIAGONAL STRIPS IN WOVEN CANE WORK.
No. 539,406. Patented May 21, 1895.
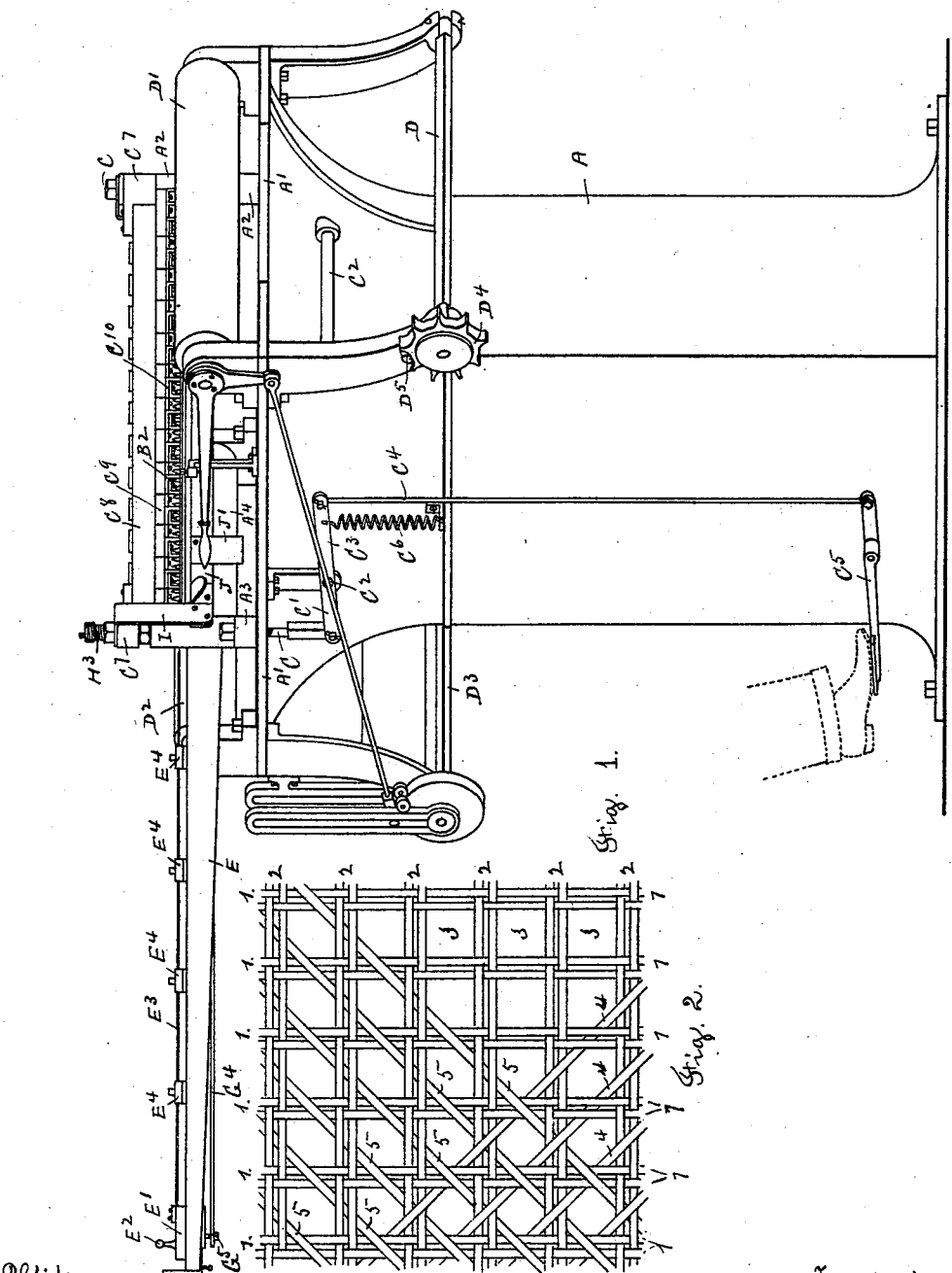
Witnesses
A. C. Whiting
Emma Kistler
Inventors
Frank H. Bancroft
Henry M. Rich
By their Attorney
Rufus B. Fowler
THE NORRIS PETERS CO., PHOTO-LITHO., WASHINGTON, D. C.

(No Model.) 4 Sheets—Sheet 2.
F. H. BANCROFT & H. M. RICH.
MACHINE FOR INSERTING DIAGONAL STRIPS IN WOVEN CANE WORK.
No. 539,406. Patented May 21, 1895.
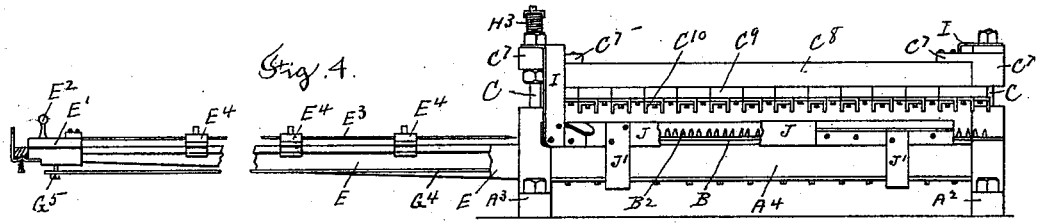
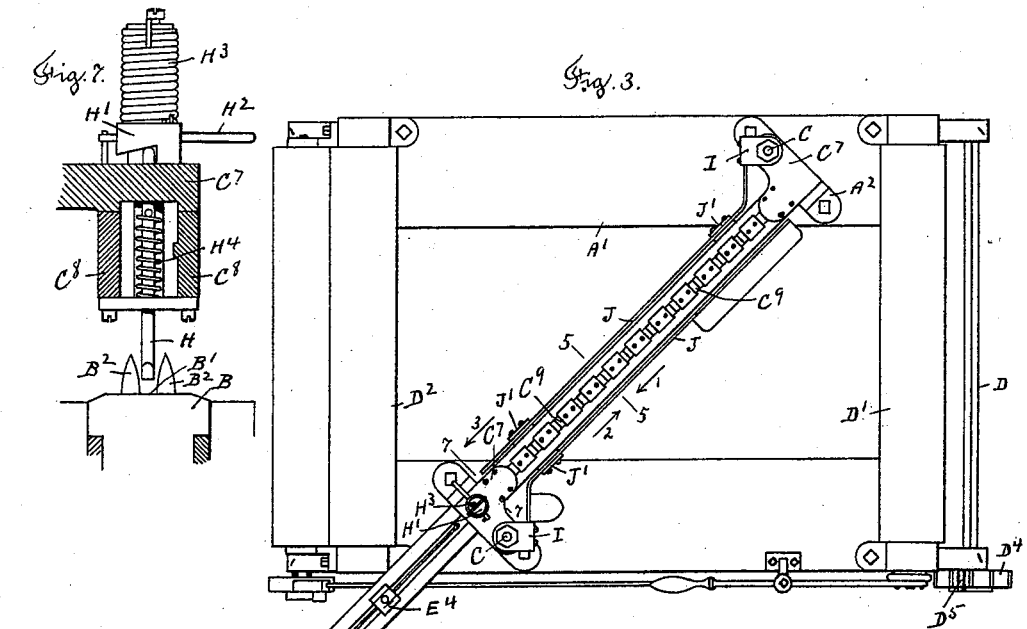
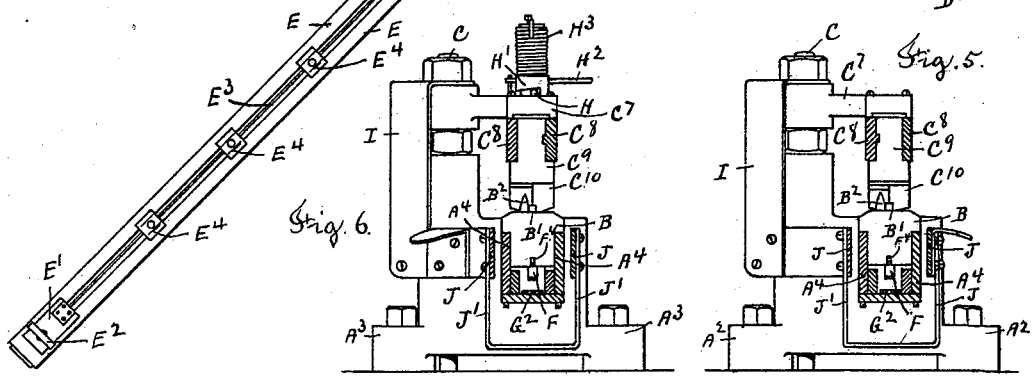
Witnesses
A. C. Whiting.
Emma Kistler.
Inventors
Frank H. Bancroft.
Henry M. Rich.
By their Attorney
Rufus B. Fowler.

(No Model.) 4 Sheets—Sheet 3.

F. H. BANCROFT & H. M. RICH.
MACHINE FOR INSERTING DIAGONAL STRIPS IN WOVEN CANE WORK.

No. 539,406. Patented May 21, 1895.

Witnesses
A. L. Whiting
Emma Kester

Inventors
Frank H. Bancroft
Henry M. Rich
By their Attorney
Rufus B. Fowler (No Model.) 4 Sheets—Sheet 4.
F. H. BANCROFT & H. M. RICH.
MACHINE FOR INSERTING DIAGONAL STRIPS IN WOVEN CANE WORK.
No. 539,406. Patented May 21, 1895.
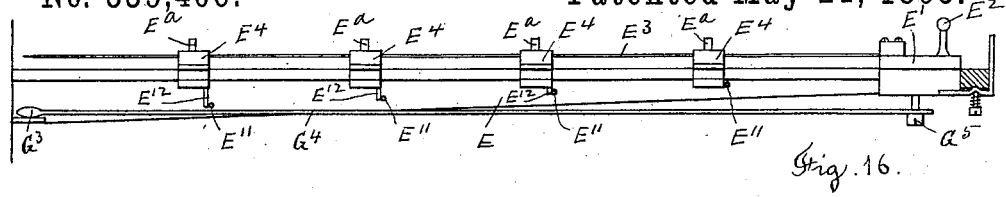
Fig. 16.
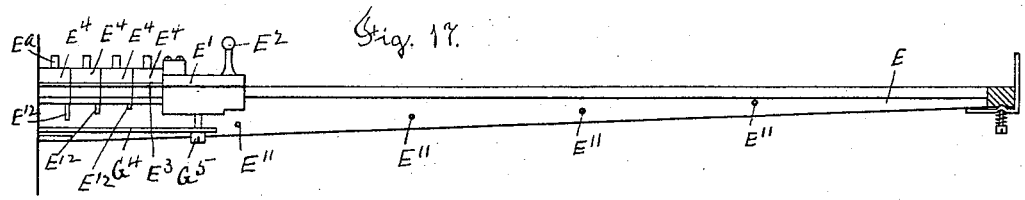
Fig. 17.
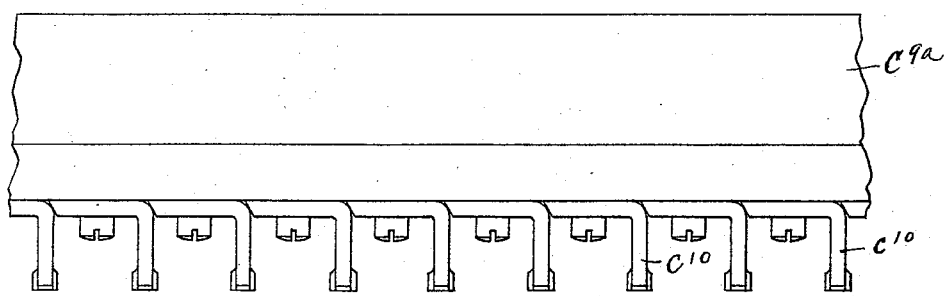
Fig. 18.
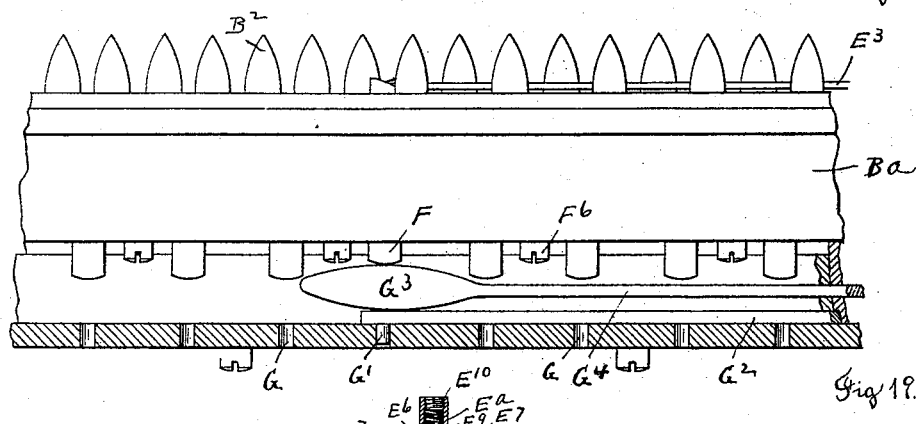
Fig. 19.
Fig. 20.
Witnesses
A. C. Whiting
Emma Kistler
Inventors
Frank H. Bancroft.
Henry M. Rich.
By their Attorney
Rufus B. Fowler

UNITED STATES PATENT OFFICE.

FRANK H. BANCROFT AND HENRY M. RICH, OF GARDNER, MASSACHUSETTS.

MACHINE FOR INSERTING DIAGONAL STRIPS IN WOVEN CANE-WORK.

SPECIFICATION forming part of Letters Patent No. 539,406, dated May 21, 1895.

Application filed December 21, 1894. Serial No. 532,603. (No model.)

*To all whom it may concern:*

Be it known that we, FRANK H. BANCROFT and HENRY M. RICH, citizens of the United States, residing at Gardner, in the county of Worcester and State of Massachusetts, have invented a new and useful Improvement in Machines for Inserting Diagonal Strips in Woven Cane-Work, of which the following is a specification, accompanied by drawings forming a part of the same, and in which—

Figure 8:
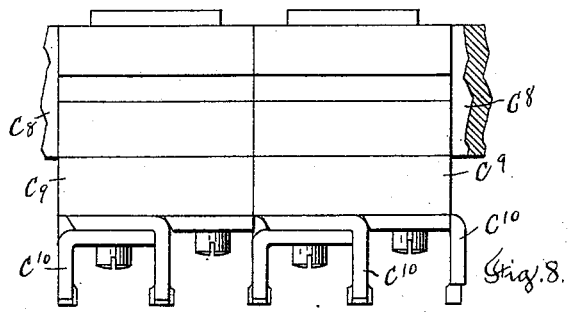
Figure 10:
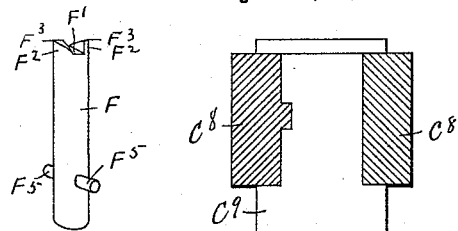
Figure 15:
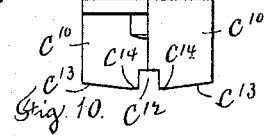
Figure 9:
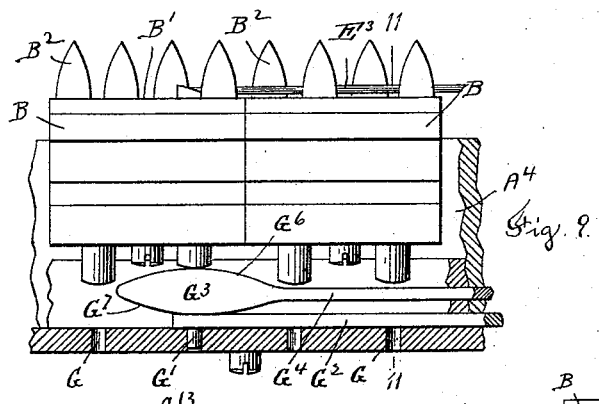
Figure 11:
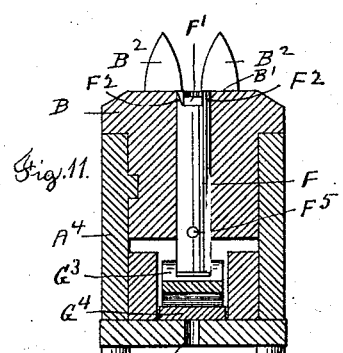
Figure 12:
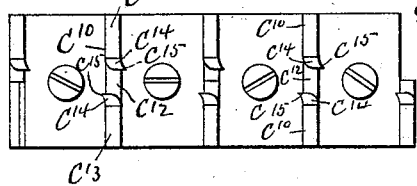
Figure 13:
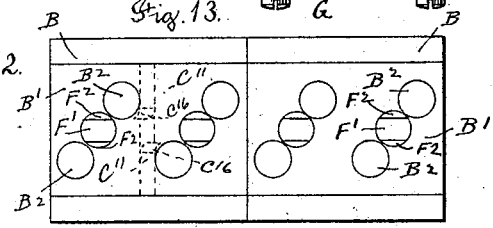
Figure 14:
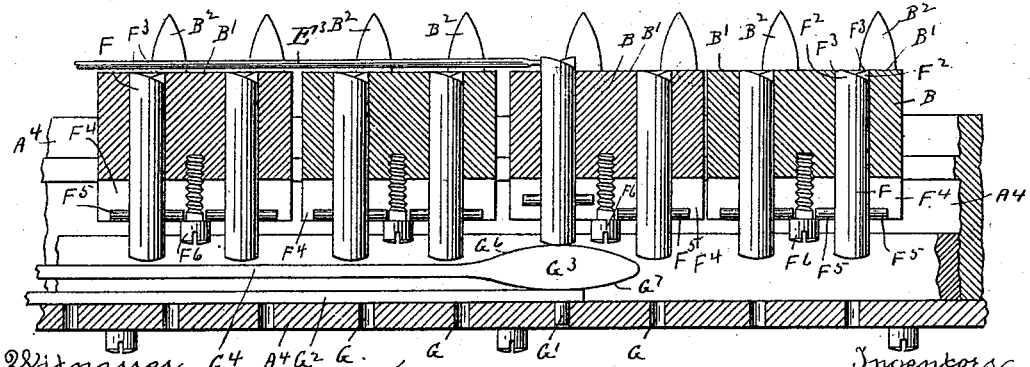

Figure 1 represents an elevation of our improved machine. Fig. 2 represents a piece of woven cane-work having diagonal strips inserted in a part of the same. Fig. 3 is a plan view of the machine. Fig. 4 is a side view of the clamping-bars and strand needle, a portion of one of the bars for lifting the web having been removed in order to disclose the conical spurs by which the meshes of the web are opened. Fig. 5 is a transverse sectional view of the clamping-bars on line 5 5, Fig. 2, looking in the direction of the arrow 2. Fig. 6 is a transverse sectional view of the clamping-bars on line 5 5, Fig. 2, looking in the direction of the arrow 1. Fig. 7 is a sectional view of the clamping-bars on line 7 7, Fig. 3, looking in the direction of the arrow 3. Fig. 8 is a side view of two of the upper clamping-blocks shown upon a larger scale. Fig. 9 is a side view of two of the lower clamping-blocks shown upon a larger scale. Fig. 10 is an end view of one of the upper clamping-blocks. Fig. 11 is a sectional view of one of the lower clamping-blocks shown on line 11 11, Fig. 8. Fig. 12 represents the under side of two of the upper clamping-blocks which are shown in side view in Fig. 8. Fig. 13 represents the upper side of two of the lower clamping-blocks which are shown in side view in Fig. 9. Fig. 14 represents a portion of the clamping mechanism shown in central longitudinal sectional view, the part shown in said figure comprising four of the lower clamping-blocks, showing the sliding strand-lifting pins and their actuating cam-plates. Fig. 15 is a perspective view of one of the strand-lifting pins. Fig. 16 is a side view of the strand-needle and sliding blocks by which the needle is supported, one of the parallel bars E having been removed in order to show the stops by which the backward motion of the sliding blocks is limited. Fig. 17 represents the same parts as are shown in Fig. 16, but with the handle E² advanced to carry the needle through the fabric and with the sliding blocks carried to the end of the bars E by their frictional contact with the needle. Fig. 18 is a side view of a portion of the upper clamping-bar when the same is made in a single piece instead of in sections, as represented in Fig. 8. Fig. 19 is a side view of a portion of the lower clamping-bar when formed in a single piece instead of in sections, as shown in Fig. 9, said Figs. 18 and 19 representing a modified construction hereinafter referred to; and Fig. 20 is a vertical central sectional view of one of the sliding blocks by which the strand-needle is supported.

Similar letters and numerals refer to similar parts in the different figures.

Our invention relates to certain improvements in machines for inserting the diagonal strips of cane alternately over and under the warp and weft strands of a woven cane fabric in which the warp and weft strands are arranged in pairs and having rectangular open spaces or meshes; and the objects of our invention are to provide mechanism by which the rectangular meshes of the woven fabric are opened when they have become partially closed by the slipping of the warp, or weft, strands; also to provide means for holding all the warp and weft strands in a diagonal line across the fabric upon a plane supporting surface by means of a clamping mechanism, whereby said warp and weft strands are brought into the same horizontal plane; also to provide means for lifting certain strands above the horizontal plane of the fabric, immediately in advance of the end of a reciprocating needle and lowering said strands upon the needle immediately after the end of the needle has passed them; also to provide means for controlling the end of the needle as it passes beneath the raised strands, and further, to provide means for releasing the needle from the diagonal strand after it has been inserted in the woven fabric; and these objects are attained by means of the mechanism hereinafter described and specifically set forth in the annexed claims.

Referring to Fig. 2, 1, 1 denote the warp strands and 2, 2 the weft strands of the woven fabric arranged in pairs at right angles to each other and forming the rectangular meshes 3, 3. A portion of the woven fabric represented in Fig. 2 is shown as having strips of cane 4, 4, inserted diagonally in one direction through the fabric, alternately over and under the warp and weft strands and also as having the strips of cane 5, 5 similarly inserted diagonally in the opposite direction. The method heretofore employed for inserting these diagonal strips in the woven cane fabric by mechanical means, is set forth in the Letters Patent Nos. 401,050 and 435,947, by which the woven fabric is placed between a pair of bars extending diagonally across the fabric and provided with projections upon their opposing faces which press upon the upper and under side of the warp and weft strands, whereby some are raised and some are depressed and brought into different planes to allow a strand needle to be inserted diagonally through the fabric over and under the warp and weft strands and a strip of cane to be inserted in the space occupied by the needle by the withdrawal of the needle.

The projections upon the bars are provided with grooves, which, when the bars are brought together to effect the elevation and depression of the strands, are brought into alignment so as to form a channel or raceway to conduct the needle through the fabric.

When a diagonal strip has been inserted by the withdrawal of the needle, the bars are separated, allowing the strands to resume the same horizontal plane when the fabric is moved along to bring the next diagonal row of meshes between the bars and the operation is repeated.

The woven fabric with its warp and weft strands 1, 1 and 2, 2, arranged in pairs and at right angles to each other with the open meshes 3, 3 when taken from the loom, is liable to become distorted as the interlacing of the warp and weft strands is not sufficient to prevent the slipping or movement of the strands, allowing the rectangular meshes 3, 3 to assume a lozenge shape, or by the separation of the strands forming a pair, reducing the size of the meshes so the strands, to be raised or depressed, are not certain to register correctly with the projections upon the bars. Considerable displacement of the strands above and below the fabric is necessary in order to carry the strands above, or below, the grooves in the projections upon the bars which form a raceway for the needle and requiring a heavy pressure to simultaneously operate upon all the strands diagonally across the fabric.

By the mechanism forming the subject of our invention we first restore the warp and weft strands to their original positions, in case they have been displaced, by crowding the fabric upon two parallel rows of conical spurs having the diameter of their bases equal to the length of one of the sides of the rectangular meshes 3, 3 and arranged to enter two parallel and contiguous diagonal rows of meshes between which the diagonal strip is to be inserted; second, we clamp the strands in a diagonal line across the fabric upon the straight plane surface of a bar placed beneath the fabric, causing all the strands to be held in a horizontal plane corresponding with the surface of the lower clamping bar; third, a single pair of strands only is raised at a time immediately in front of the end of the needle, and as the needle passes beneath them, it is made to slide over an inclined surface which raises the end of the needle above the next pair of strands when the raised strands are lowered down upon the body of the needle, causing the needle as it advances through the fabric to be tightly held between the strands which pass alternately above and below it.

When the end of the advancing needle has thus been carried beneath and above the strands of the fabric, the next alternate pair of strands is lifted in the same manner and the operation repeated, causing the alternate pairs of strands to be successively acted upon immediately in front of the needle and in correspondence with its advance movement. When the needle has passed diagonally through the fabric the end of a cane strip is inserted through the eye of the needle and the needle retracted, drawing the cane strip through the fabric. After the cane strip has been laid within the fabric and before the needle has completed its reverse movement, the cane strip just back of the needle is clamped between the lower bar and a sliding pin, which is actuated by a cam, thereby holding the strip from further movement and causing its end to be drawn out from the eye of the needle by the continued movement of the needle.

In the accompanying drawings, we have only shown in detail such portions of the mechanism as concern our present invention.

A denotes a frame-work supporting a table A' to which are attached the stands $A^2$ and $A^3$ which support the ends of a trough-shaped frame $A^4$ extending diagonally across the table A'.

In the frame $A^4$ are placed a series of short blocks B, placed end to end, and preferably with a small space intervening between the ends of the blocks as shown in Fig. 14 in order to admit of a slight longitudinal movement of the blocks B within the frame $A^4$, in order to allow them to move slightly to bring their projecting spurs into accurate registration with the meshes of the fabric. This slight longitudinal movement is caused by pressing the woven fabric down upon the ends of the projecting spurs $B^2$ and occurs whenever the meshes of the fabric fail to register accurately with the spurs; but when the woven fabric has been crowded down upon the bases of the spurs $B^2$ the blocks B will be held in a fixed position by the woven fabric.

It will be obvious that the blocks B could be united into one continuous bar, as shown at B$^a$, Fig. 19, and the meshes of the woven fabric be brought to register with the spurs B$^2$ held in a fixed position; but this would increase the strain upon the woven fabric as the action of the spurs corrected the displacement of the strands, and we, therefore, prefer to construct the lower clamping bar of the blocks B, each capable of a slight longitudinal movement.

The blocks B form the lower clamping bar extending diagonally beneath the woven fabric and having its upper surface B' smooth except for the conical spurs B$^2$, hereinafter described, so that when the strands of the woven fabric are crowded down into contact with the surface B', they will all be brought into the same horizontal plane. The conical spurs B$^2$ project upward from the blocks B and are arranged in two parallel rows with their upper ends pointed so they will enter readily into the parallel and contiguous rows of meshes extending diagonally across the woven fabric. The bases of the spurs B$^2$ are circular with their diameter equal to the length of one of the sides of the rectangular meshes 3, so that when the spurs B$^2$ have been crowded into the meshes, the strands of the fabric, if they have been displaced, will be crowded apart, thereby restoring the normal size of the meshes.

The stands A$^2$ and A$^3$ hold the vertical sliding rods C, C, connected at their lower ends, to radial arms, one of which is shown at C', Fig. 1, attached to a rock-shaft C$^2$ operated by a radial arm C$^3$, link C$^4$ and foot treadle C$^5$, to depress the vertical rods C, C. When pressure is removed from the treadle, the rods C, C are raised by means of a spring C$^6$ connecting the radial arm C$^3$ with the frame of the machine. The upper ends of the vertically sliding rods C, C carry the horizontal arms C$^7$ to which are attached the ends of the parallel bars C$^8$, C$^8$ which form a frame-work to support the short blocks C$^9$ placed end to end between the bars C$^8$, C$^8$ and held directly over the blocks B. The blocks C$^9$, like the blocks B, could be united into a continuous bar, as shown at C$^{9a}$, Fig. 18, but we prefer them separate and capable of a slight longitudinal movement in the bars C$^8$, C$^8$ so they may correspond with the position of the blocks B.

To the under side of the blocks C$^9$ are attached blades C$^{10}$ projecting vertically from the face of the blocks C$^9$ so that when the blades C$^{10}$ are carried down into contact with the surface B', they will occupy the position between the spurs B$^2$ indicated by the broken lines C$^{11}$, Fig. 13, causing the woven fabric inserted between the blocks B and C$^9$, to be pushed down upon the conical spurs B$^2$, bringing the strands into contact with the surface B' of the blocks B.

The blades C$^{10}$ are provided at their ends with notches C$^{12}$ in alignment with each other, so as to allow the strand needle to pass through when the ends of the blade are brought down to clamp the woven fabric upon the upper surface of the blocks B.

The end of each blade, upon each side of, and adjacent to the notch C$^{12}$, is provided with a limited horizontal surface C$^{14}$ forming the bearing surface of the blade upon the woven fabric.

The blade between the horizontal surfaces C$^{14}$ and the edges of the blade are chamfered, or beveled, as shown at C$^{13}$, Fig. 10, in order to limit the bearing surfaces upon the woven fabric to the horizontal surfaces C$^{14}$. The end of each blade is also slightly bent laterally upon each side of the notch C$^{12}$; the blade being bent in one direction upon one side of the notch and in the opposite direction upon the other side of the notch, as shown at C$^{15}$, Fig. 12, in order to cause the sides of the blade to partially inclose the conical spurs B$^{12}$, as represented by the broken lines at C$^{16}$, Fig. 13, so the strands of the woven fabric, which lie beneath the bearing surfaces C$^{14}$ of the blade, will be pushed down over the tapering side of the conical spurs B$^2$ and held firmly against the surface B' of the lower blocks B.

The woven fabric, in the form of a long web and wound upon a bar D journaled at the rear of the machine, is carried over the rolls D' and D$^2$ to a take-up roll D$^3$ and between the clamping blocks B and blades C$^{10}$ and any well known means are provided by which the take-up roll D$^3$ can be intermittently rotated in order to draw the fabric along and any well known means are applied to the delivery roll D by which the fabric is held taut and under the requisite tension, as for example, a toothed wheel D$^4$ can be attached to the delivery roll D with its teeth spaced to correspond to the distance between the centers of contiguous diagonal rows of meshes, and a pin D$^5$ can be inserted between the teeth and held in the frame-work of the machine to prevent the rotation of the delivery roll D during the depression of the vertical rods C, C and when it is desired to move the fabric along, the pin D$^5$ can be removed and the take-up roll D$^3$ rotated to draw the fabric along the distance of one row of meshes and the retaining pin D$^5$ replaced between the next pair of teeth, or in lieu of the toothed wheel and pin, a friction strap, or brake, can be applied to the delivery roll similar to that used in looms. The mechanism for moving and controlling the fabric forms no part, however, of our present invention and we have not, therefore, deemed it necessary to show, or describe, the same in detail.

Extending from one side of the machine and in alignment with the row of blocks B are a pair of parallel bars E, E forming a track for a sliding needle carrier E' provided with a handle E$^2$ by which it is moved along the bars E, E by hand. To the needle carrier E' is attached the strand needle E$^3$ which passes through eyes formed in the blocks $E^4$ supported by the bars E, E, for the purpose of preventing any deflection of the needle.

The blocks $E^4$ are capable of sliding along the bars E, E, and each of the blocks $E^4$ is provided with a hollow pin $E^a$ held loosely in a hole in the sliding block. Each of the hollow pins $E^a$ is provided with a transverse hole $E^6$, in alignment with holes $E^7$ extending through the sliding block $E^4$ to receive the strand needle.

The transverse holes $E^6$ are bushed with leather $E^8$, or some similar material and upon the upper and lower sides of the leather bushing $E^8$ are placed spiral springs $E^9$, $E^9$ having one end resting upon the leather bushing $E^8$, and the opposite ends bearing against screws $E^{10}$, $E^{10}$ held in the ends of the hollow pins $E^a$, so the tension of the springs $E^9$ can be made to increase the pressure of the leather bushing $E^8$ upon the strand needle. The blocks $E^4$ are carried forward as the needle is advanced through the fabric by the frictional resistance between the needle and the bushing $E^8$, so that when the needle has been pushed forward through the fabric, all the blocks $E^4$ will be brought to the end of the bars E, E next the machine, as represented in Fig. 17, and when the needle is retracted, the blocks $E^4$ will be drawn back and distributed along the bars E, E, as shown in Fig. 16, by means of pins $E^{11}$, properly arranged along the bars E, E. The stop pins $E^{11}$ are arranged in different horizontal planes; the pin nearest the machine being the lowest and each succeeding stop pin being in a higher plane than the next preceding.

Projecting from the lower sides of each of the sliding blocks $E^3$ are lugs $E^{12}$ of unequal lengths; the lug nearest the machine being the longest, so the blocks as they are drawn back by the withdrawal of the needle will be stopped by the pins $E^{11}$ at different points along the bars E, as represented in Fig. 16.

In the blocks B are the vertically sliding pins F having the central section of their upper ends beveled, as at F', Fig. 15, and upon each side of the beveled section F' are the projecting lips $F^2$ with their edges beveled in opposite directions so the corners $F^3$, $F^3$ will bear against the under side of the strands and next to the conical spurs $B^2$. The blocks B, on their under side, are provided with longitudinal grooves, or channels, $F^4$ to receive the pins $F^5$ projecting from opposite sides of the vertically sliding pins F so as to be caught by the heads of screws $F^6$ held in the blocks B, thereby preventing the sliding pins F from dropping out of the blocks B and holding them in their normal positions with the corners $F^3$ of the lips $F^2$ flush with the upper surface B' of the blocks B.

The bottom of the trough-shaped frame $A^4$ in which the blocks B are held, is provided with a series of holes G to receive a dowel pin G' held in an adjustable plate $G^2$ which rests upon the bottom of the trough-shaped frame $A^4$ and is adjusted in position and held from longitudinal movement by the dowel pin G'. Sliding upon the adjustable plate $G^2$ is a lifting cam $G^3$ formed upon the end of a bar $G^4$, which is loosely connected at its opposite end with the needle carrier E' by means of a screw $G^5$; the connecting bar $G^4$ being of suitable length to bring the center of the lifting cam $G^3$ beneath the free end of the strand needle $E^5$, so that, as the carrier E' is moved along the bars E, E, the lifting cam $G^3$ will be simultaneously pushed along the surface of the adjustable plate $G^2$.

As the lifting cam $G^3$ advances it will successively pass beneath and lift the vertically sliding pins F, one after the other; each of the sliding pins F being lifted in turn immediately in advance of the end of the needle; the corners $F^3$ of the lips $F^2$ lifting the strands which lie upon them, so the needle will pass beneath them and as the end of the needle advances over the pin, it will slide upon the beveled surface F', causing the end of the needle to be raised so it will pass over the next strands which are held down upon the surface B' by the bearing surfaces $C^{14}$ of the blades $C^{10}$.

The upper surface $G^6$, of the lifting cam $G^3$ is curved to act against the lower ends of the pins and the lower surface $G^7$ is curved so it will slide easily over the adjustable plate $G^2$ and also to allow it to drop when it has been pushed beyond the end of the adjustable plate and rest upon the bottom trough-shaped frame $A^4$, bringing its upper curved surface $G^6$ too low to engage the sliding pins F. The point at which the lifting cam $G^3$ is disengaged from the pins F is determined by the adjustment of the plate $G^2$, which, in the operation of the machine, is adjusted to correspond with the width of the fabric so as to cause the lifting cam $G^3$ to drop when the point of the needle has passed through the fabric.

When the strand needle has been pushed through the fabric the end of a strand is inserted in the eye of the needle and the needle retracted, drawing the strand through the fabric.

The strand when it has been laid in the fabric is clamped upon one of the lower blocks B by means of a sliding pin H shown in Fig. 7, which is pressed down upon the strand by means of a cam H' rotated by means of the handle $H^2$ which is manually operated to actuate the pin. When released the cam is reversed by means of a torsional spring $H^3$, allowing the needle to be lifted by a spring $H^4$. When the pin H is crowded down upon the strand, pinching it between the end of the needle and one of the lower blocks B, the reversed movement of the needle is continued a short distance causing the end of the strand to be pulled out of the needle.

Carried by the sliding rods C, C are the plates I, I extending downward and to the lower ends of the plates I, I, we attach the horizontal bars J, J, extending diagonally across the machine and parallel with and upon each side of the blocks B, B. These bars J, J pass beneath the woven fabric and are raised and lowered by the up and down movement of the sliding rods C, C.

The upper edges of the bars J, J in their elevated positions, are in a plane slightly above the tips of the conical spurs $B^2$ and in their lowest they are slightly below the surface $B'$ of the blocks B. We term these bars stripping bars, and their office is to lift the fabric after it has been pushed down upon the surface $B'$ and strip it from the spurs $B^2$. Each of the stripping bars J is attached at one end to one of the downwardly extending plates I, I and its free end is connected with the opposite stripping plate by means of the U-shaped plates $J'$, $J'$.

In the normal position of the parts, the sliding rods C, C are raised, lifting the blades $C^{10}$ above the spurs $B^2$ and holding the upper edges of the stripping bars J, J slightly above the tips of the spurs $B^2$ and in the horizontal plane connecting the tops of the rolls $D'$, $D^2$, across which the woven fabric is stretched. The foot treadle $C^5$ is then depressed bringing the blades $C^{10}$ down upon the fabric and crowding the two contiguous, diagonal rows of meshes over the conical spurs $B^2$ which replace any disarranged strands, and secure their proper registration with the lifting pins, and holding the strands of the fabric beneath the blades against the straight surface of the blocks B, B, and in the same horizontal plane. No separation, however, is effected by the pressure of the blades $C^{10}$ upon the blocks B. The needle $E^3$ is next advanced, and as the end of the needle approaches the strands it should pass beneath the lifting cam $G^3$, which advances simultaneously with the end of the needle, raises the first in the series of pins F, thereby lifting the first strands beneath which the needle is to pass and at the same time presenting the inclined surface of the beveled section $F'$ in the path of the needle, causing the end of the needle to be slightly raised to allow it to pass above the next strands of the fabric lying upon the surface $B'$ of the block B. When the needle has passed over these strands the pin falls, allowing the strands which it had raised to drop upon the body of the needle and hold it down, and the next succeeding pin F is raised and the operation repeated, until the needle has been passed through the fabric. The needle is then threaded with a strand of cane and drawn back, drawing the strand of cane through the fabric; the succesive lifting of the pin F, of course, occuring as the lifting cam $G^3$ moves back beneath the pins. The strand so drawn into the fabric is clamped by the pin H and released from the needle, as already described. The foot treadle $C^5$ is released and the blades $C^{10}$ and stripping bars J, J are lifted by means of the spring C carrying the fabric off the spurs $B^2$, and, allowing it to be fed forward to receive the next diagonal strand. When the diagonal strands 4, 4 have been inserted the diagonal strands 5, 5 are inserted in the opposite direction, in a similar manner; preferably by a machine in which the strand actuating mechanism is arranged across the machine diagonally in the opposite direction.

We do not wish to confine ourselves to the specific features of construction as shown, as such may obviously be modified without departing from the scope of our invention, as, for example, the blocks B and $C^9$ could be united into a continuous bar, as shown in Figs. 18 and 19, instead of being made in sections as shown in certain other figures, and the connected operating mechanism by which the blades $C^{10}$ are made to clamp the strands upon the blocks $B'$, and also by which the sliding pins F are raised can be varied, as will readily be suggested by the skill of the mechanic.

We do not desire to claim broadly herein the use of sliding pins for lifting the strands of the woven fabric, but in the machine forming the subject of the present application, such sliding pins are employed in combination with a clamping bar having a plane surface and an opposing clamping bar by which all the strands of the fabric are held in the horizontal plane and as the end of the needle is advanced certain of the strands are lifted from the plane surface of the lower clamping bar to allow the needle to pass between them; and the end of the needle is also lifted to carry it over certain of the strands, which lie upon the plane surface of the lower clamping bar and when the end of the needle is moved forward, the strands which have been raised are allowed to fall upon the needle and by their tension hold the body of the needle down.

What we claim as our invention, and desire to secure by Letters Patent, is—

1. In a machine for inserting the diagonal strips in a woven cane fabric, the combination with a clamping block extending diagonally beneath the woven fabric, and presenting a plane surface upon which the strands of the woven fabric rest, blades arranged to bear upon the upper surface of the woven fabric, as it rests upon the plane surface of said clamping block, whereby said strands are held in the same plane, a series of sliding pins arranged to lift certain strands off the plane surface of said clamping block, and means by which said pins are moved against the strands of the woven fabric, substantially as described.

2. In a machine for inserting the diagonal strips in a woven cane fabric, the combination with mechanism for clamping the woven fabric whereby the strands are held in a horizontal plane diagonally across the fabric, of a series of sliding pins arranged to raise certain of the strands of the woven fabric by their sliding motion, and means by which said pins are moved against the strands of the woven fabric, substantially as described.

3. In a machine for inserting the diagonal strips in a woven cane fabric, the combination with clamping mechanism between which the fabric is held and a reciprocating strand needle, of a series of sliding pins provided with inclined or beveled ends, and means by which said pins are raised and their beveled ends brought into the path of the needle, whereby the end of the needle is raised, substantially as described.

4. In a machine for inserting the diagonal strips in a woven cane fabric, the combination with clamping mechanism between which the fabric is held with its strands in the same horizontal plane, of a series of sliding pins arranged beneath the fabric, a strand needle arranged to pass through the fabric in a line with said clamping mechanism, a sliding cam moving beneath said pins and in correspondence with the end of said needle, and means for moving the same, whereby said pins are successively raised in advance of the needle and thereby raising certain of the strands of the fabric and also the end of the needle, substantially as described.

5. In a machine for inserting the diagonal strips in a woven cane fabric, the combination of a clamping mechanism between which the fabric is held with its strands in the same horizontal plane, a strand needle arranged to pass through the fabric in a line with said clamping mechanism, a series of sliding pins adapted to be pushed against the strands of the fabric, a sliding cam moving in correspondence with said strand needle, whereby said pins are successively raised to lift certain of the strands of the fabric, and successively lowered to allow the raised strands to fall upon the strand needle, substantially as described.

Dated this 17th day of December, 1894.

FRANK H. BANCROFT.
   HENRY M. RICH.

Witnesses:
 THATCHER B. DUNN,
 CHARLES B. BOYCE.